Jan. 25, 1938.   C. J. HALBORG   2,106,213
BROACHING MACHINE
Filed April 19, 1935
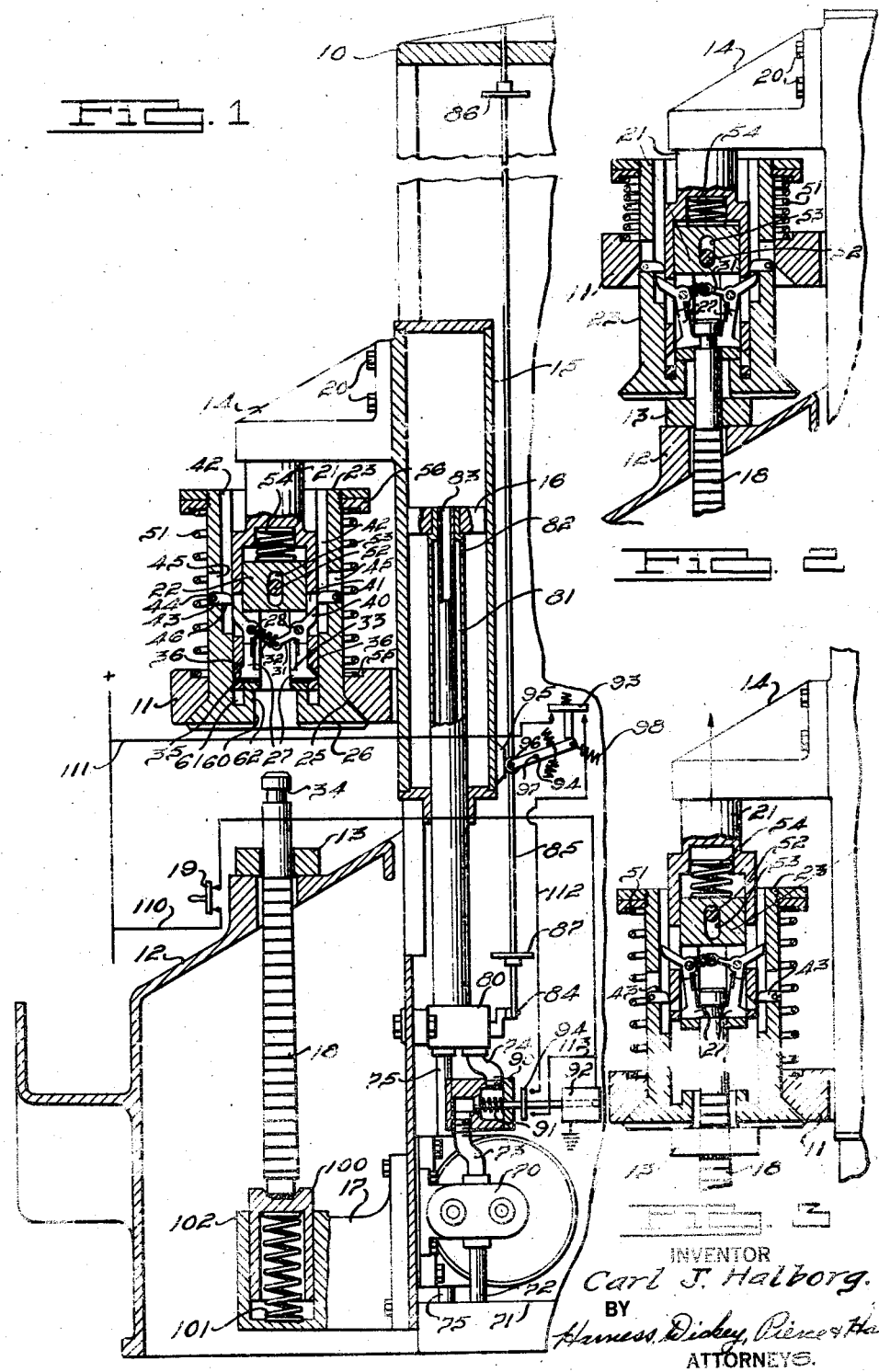
INVENTOR
Carl J. Halborg.
BY
Harness, Dickey, Pierce & Ham.
ATTORNEYS.

Patented Jan. 25, 1938

2,106,213

UNITED STATES PATENT OFFICE 2,106,213

BROACHING MACHINE

Carl J. Halborg, Detroit, Mich., assignor to Colonial Broach Company, a corporation of Michigan Application April 19, 1935, Serial No. 17,198

9 Claims. (Cl. 90—33)

The present invention relates to machines for operating metal working tools, and particularly to machines arranged to provide an automatic operating cycle for a broaching tool used to machine an aperture.

In accordance with the invention disclosed and claimed in the copending application of Richard A. Thompson, Serial Number 35,693, filed August 7, 1935, and assigned to the assignee of the present invention, the initiation of a broaching operation is controlled manually while the sequence of various subsequent operations is entirely automatic. Upon the actuation of a manual control means, the broaching machine engages the broaching tool, with respect to which the work piece may have previously been positioned, draws it through the opening in the work, and thereafter returns and releases the broach. The motion of the broaching machine head, which engages the broaching tool, is reciprocating in character. At the conclusion of each broaching operation, the broaching head is automatically stopped at a loading point intermediate the ends of its path of motion. At the beginning of each broaching operation, the head moves to one extreme of its path of travel, engages the broaching tool, and is automatically reversed and restarted in the opposite direction. The release of the broaching tool occurs after the broaching machine head has travelled to the opposite extreme of its path of travel, automatically reversed, and returned to the loading point. The present invention is concerned primarily with the provision of an improved construction of broaching head and control means therefor, and which is particulary adapted for use in practicing the invention of the above identified Thompson application.

Accordingly, the principal objects of my invention are: to provide a broaching machine having a head which engages and releases the tool during a cycle of movement; to provide an improved broach head particularly adapted for use in a broaching machine provided with control mechanism which moves the head to grasp the broach, returns to pull the broach through the work and again returns and releases the broach; to provide fingers on the head which engage the broach and lock the broach thereto; to provide control means which operates the head to seize the broach, to reverse the movement of the head, to again reverse such movement and stop and release the broach at the initial point of movement; to provide such a broaching machine which is of relatively simple construction, economical of manufacture, and accurate and positive in operation.

Other objects and features of novelty of my present invention will be either specifically pointed out or will become apparent when referring, for a better understanding of my invention, to the following description taken in conjunction with the accompanying drawing, wherein:

Fig. 1 is a view in side elevation, partly in section, of an illustrative embodiment of the present invention;

Fig. 2 is a view in side elevation, partly in section, of a broaching head which may be used in the practice of the present invention, and illustrating the positioning of the parts when the machine is in readiness to begin the drawing of the broach through the work piece; and, Fig. 3 is a view corresponding in general to Fig. 2, but showing the positioning of the parts during the course of the drawing of the broaching tool through the work piece.

Referring generally to the several figures of the drawing, the illustrated embodiment of the present invention comprises a frame 10, formed with two stationary bed plates 11 and 12 which are disposed to support a work piece 13 at different stages of a broaching operation; a broaching head 14, which is reciprocated by suitable hydraulic mechanism comprising a movable piston chamber 15, a stationary piston 16 and associated mechanism, later described; a resilient base 17 for supporting and receiving a broach 18 upon release thereof by broaching head 14; and suitable electro-mechanical control apparatus illustrated as comprising a manually operable switch 19 and related elements described more in detail hereinafter.

Considering the above mentioned elements more in detail, broaching head 14, which is secured to chamber 15 by bolts 20, comprises a hollowed out cylindrical shank 21; a support 22 slidably fitted within member 21; and an outer sleeve 23, the lower end 24 of which is finished with laterally extending shoulders 25 which engage bed plate 11 and which terminates in a flat surface 26 against which work piece 13 bears during the course of a broaching operation.

Support 22 is hollowed out, and is provided with two diametrically opposed longitudinal openings, to receive two clamps 27, journaled therein on pins 28. Pins 28 are connected together by a toggle connection comprising arm 31 and a compression spring 32. As will be understood, this connection biases arm 31 to occupy either the position illustrated in Fig. 1, or the position shown in Figs. 2 and 3. Clamps 27 are formed with inner shoulders 33, disposed to engage a cooperating shoulder 34 formed at the upper end of broach 18, and with sloping outer shoulders 35, disposed to enter cooperating recesses 36 formed in shank 21.

The outwardly turned ends 40 of clamps 27 extend through longitudinal openings 41 formed in shank 21, and enter longitudinal recesses 42 formed in sleeve 23.

Cams 43, disposed to actuate clamps 27 under certain hereinafter described conditions, are pivotally mounted by pins 44 in longitudinal openings 45 formed in sleeve 23. The mounting of cams 43 is such that limited rotation thereof in one direction is possible, but rotation thereof in the opposite direction is prevented by shoulders 46.

Spring 51, which surrounds sleeve 23, is seated between recess 55 formed in bed plate 11, and a member 56 threaded to member 23, and resiliently supports sleeve 23 on bed plate 11. Support 22 is slidably supported in shank 21 by a pin 52, suitably journaled in shank 21, and which passes through a slot 53 formed in support 22. A compression spring 54, stronger than spring 51, is freely seated between members 21 and 22 and influences the relative positions thereof under certain conditions as hereinafter described.

Sleeve 23, provided with an opening 60, through which broach 18 passes, is also provided with an annular recess 61 which receives the lower ends of shank 21, and with an annular shoulder 62, which provides a bearing surface for the lower end of member 22, under certain hereinafter described conditions of operation.

A pump 70, which may be of any suitable type, is rigidly fixed to frame 10, and supplies fluid pressure to chamber 15 from any suitable source 71 through intake pipes 72, 73 and 74. An exhaust line 75 also communicates with source 71. A suitable reversing valve 80, which may be of any conventional type, is arranged, when in the illustrated position, to connect supply line 74 with a pipe 81, which is fixed to piston 16 and communicates with the lower portion of chamber 15 through ports 82; and to connect exhaust line 75 to pipe 82. Pipe 82, concentric with pipe 81, is fixed to piston 16 and communicates with the upper portion of chamber 15. In the opposite position of valve 80, line 74 is connected to pipe 82, and exhaust line 75 is connected to pipe 81.

Valve 80 is arranged for actuation by a crank 84, which is connected to a push rod 85. Push rod 85 is provided with collars 86 and 87. Collar 86 is disposed for actuation by the upper end of chamber 15 when the latter reaches the upper extreme of its movement, to thereby move crank 84 to the illustrated position. Collar 87 is arranged for actuation by the lower end of chamber 15 when the latter reaches the lower limit of its path of movement, to thereby rotate crank 84 and actuate valve 80 to the previously mentioned opposite position.

Supply lines 73 and 74 are connected together through an electro-mechanically operated valve 90, which is biased to the illustrated closed position by spring 91, and may be actuated to the open position by solenoid 92. The circuit for solenoid 92 is arranged for control by push button 19, a cam operated switch 93 and by self-holding contacts 94, the latter contacts being closed during the energized condition of solenoid 92.

Push button 19 is preferably located for convenient operation by the operator of the machine, and switch 93 is arranged for actuation by an arm 94, and a cam 95 formed on chamber 15. Switch 93 normally occupies the closed position, but may be actuated to the illustrated open position during downward movement of chamber 15, by the engagement between cam 95 and the roller 96 associated with arm 94. In response to this engagement, arm 94 is rotated about pin 97, and moves switch 93 upwardly. The engagement of cam 95 with roller 96 has no effect on switch 93 during upward movement of chamber 15 since, under these conditions, the consequent rotation of arm 94 is in a direction away from switch 93. Spring 98 biases arm 94 to a horizontal position.

Member 17, which as mentioned supports broach 18 when in the released position, comprises a cylindrical member 100, hollowed out to receive a compression spring 101, and slidably fitted in a cooperative cylinder 102.

With reference to the operation of the machine as a whole, the parts are illustrated in Fig. 1 in the positions occupied thereby when a broaching operation is to be begun, work piece 13 being shown as fitted over the end of broach 18 and supported upon bed plate 12. It will be understood that while the positioning of piece 13 with respect to broach 18 is illustrated as accomplished simply by fitting it over broach 18, other positioning means may be employed.

Closure of push button 19 completes a circuit for solenoid 92 which extends from the positive terminal of a suitable source of power through conductor 110 and solenoid 92 to ground. Upon completion of this circuit, solenoid 92 moves valve 90 to the open position and closes contacts 94. The latter contact prepares a self-holding circuit for solenoid 92 which extends from the positive terminal through conductor 111, switch 93, conductor 112, contacts 94 and conductor 113 to solenoid 92. Upon closure of switch 93, which occurs as mentioned below, the circuit for solenoid 92 remains complete until the termination of the broaching operation being described.

With valve 90 in the open position, and with valve 80 in the illustrated position, as previously described, the lower portion of chamber 15 is connected to the supply source 73 and the upper portion thereof is connected to the exhaust line 75. Accordingly, chamber 15 moves downwardly, carrying broaching head 14 with it. This motion moves cam 95 out of engagement with roller 96, closing switch 93 and completing the above described self-holding circuit for solenoid 92.

Because of the engagement of shoulder 62 and the lower end of support 22, and because of the influence of compression spring 54, members 22 and 23 move downwardly with member 21, compressing spring 51. As shank 21 approaches the position with respect to bed-plate 12, illustrated in Fig. 2, work piece 13 and bed plate 12 prevent further downward movement of sleeve 23 and support 22. Shank 21, however, continues downwardly, compressing spring 54.

Compression of spring 54 causes support 22 to move inwardly with respect to shank 21. In the course of this movement, the sloping shoulders 35 associated with clamps 27 ride along the inclined surfaces 36 formed in shank 21, forcing clamps 27 inwardly. This action moves shoulders 33 of clamps 27 under shoulder 34 of broach 18, and throws toggle members 31 and 32 to the position illustrated in Fig. 2, in which position clamps 27 are biased to the broach engaging position.

At an appropriate stage of the above described broach engaging motion of shank 21, the lower end of chamber 15 engages collar 87. The remaining downward movement of chamber 15, accordingly, moves valve 80 to the opposite position, reversing the connections between chamber 15, supply line 74 and exhaust line 75. In response to this action, the downward movement of chamber 15 is interrupted, and an upward movement thereof is initiated.

The consequent upward movement of shank 21 subjects support 22 to no upward force, except the biasing force of spring 51, until after pin 52 engages the upper end of slot 53 in support 22. Thereafter, support 22 and broach 18 are positively moved by the latter engagement. Throughout such movement, shank 21, support 22, clamps 27 and broach 18 occupy the relative positions illustrated in Fig. 3.

As the initial upward movement of shank 21 continues, following the engagement of pin 52 and the lower end of slot 53, sleeve 23 resumes the extended position illustrated in Fig. 3, in which shoulders 25 bear against cooperating surfaces formed in bed plate 11. This movement of sleeve 23, as previously explained, is influenced by spring 51.

In the course of the above described initial upward movement of the parts associated with broaching head 14, during which support 22 moves upwardly within sleeve 23, the ends 40 of clamps 27 engage and rotate cams 43 about their associated pivots 44. This motion, however, has no effect upon the position of clamps 27 with respect to supports 22 and broach 18.

As the upward motion of chamber 15 continues, after the above described initial adjustments of the relative positions of shank 21, support 22 and sleeve 23, shank 21 and support 22 are moved out of engagement with sleeve 23, and sleeve 23 remains resiliently fixed in position with respect to bed plate 11 by spring 51.

After broach 18 has been completely drawn through work piece 13, and depending upon the adjustment of collar 86 on push rod 85, the upper end of chamber 15 engages collar 86, and upon further movement, reverses the position of valve 80, again establishing conditions to cause chamber 15 to move downwardly. Accordingly, the upward movement of chamber 15 is interrupted and downward movement thereof is begun.

As shank 21 and support 22, moving downwardly, approach the loading position shown in Fig. 1, shank 21 again enters sleeve 23. In the course of this movement, arms 40 of clamps 27 engage cams 43. At this time, spring 54 is spaced somewhat from shank 21, as shown in Fig. 3, and therefore exerts no biasing force on support 22. Sleeve 23, on the other hand, is biased to the position shown in Fig. 1 by spring 51. Accordingly, cams 43 interrupt further downward movement of support 22, causing shank 21 to move downwardly with respect to support 22. When shoulders 35, associated with clamps 27, reach positions opposite to recesses 36, the upper end of spring 54 engages shank 21, tending to prevent further upward movement of support 22 in shank 21. Further downward movement of shank 21, accordingly, causes clamps 27 to rotate about their pivot points, swinging shoulders 35 into recesses 36, and releasing broach 18. Broach 18, accordingly, drops to the position illustrated in Fig. 1, in which it is resiliently supported on the previously described assembly associated with member 17.

The rotation of clamps 27, above mentioned, also throws the toggle members 31 and 32 to the position shown in Fig. 1, in which these members are effective to bias clamps 27 to the broach releasing position.

At an appropriate state of the above mentioned broach releasing movement of shank 21, cam 95 formed at the lower end of chamber 15, engages the roller 96. The consequent movement of arm 94 is adjusted to open contacts 93 just after broach 18 is released. Upon the opening of contacts 93, the previously mentioned self-holding circuit for solenoid 92 is interrupted, and valve 90 accordingly resumes the illustrated closed position under the influence of biasing spring 91. As a result, chamber 15 is disconnected from the supply and exhaust lines 74 and 75, respectively, and is stopped in the position illustrated in Fig. 1, in which it is resiliently supported on spring 51 and bed plate 11. As will be evident from previous description, the machine remains in this position until a duplicate operation is initiated by again closing button 19. As will be understood also, the release of broach 18 upon the approach of head 21 to the loading position, affords an opportunity to place a new work piece over the end of broach 18 in readiness for the next broaching operation.

From the above description, it will be seen that the present invention provides an automatic broaching machine, arranged to provide a complete automatic work cycle including a loading or broach engaging movement, a broaching movement, and a return movement to a loading position, in the course of which the broach is automatically released to enable the application of a new work piece.

Although a specific construction has been described, it will be evident that various modifications may be made in the form and arrangement of parts without departing from the spirit and scope of the present invention, the described embodiment of which is to be considered in an illustrative, and not in a limiting sense.

What is claimed is:

1. In a machine for operating a tool to be drawn through a work piece, a head constructed to engage and disengage said tool, means for moving said head in a reciprocating path, tripping means for cooperating with said head to cause said head to disengage said tool, and stationary means for supporting said tripping means adjacent the path of movement of said head for limited movement parallel to the path of travel of said head.

2. In a machine for operating a tool to be drawn through a work piece, a tool head constructed to engage and disengage said tool, comprising an outer sleevelike member, a core slidably supported within said sleevelike member, means rendered effective during movement of said head for interrupting the motion of said core member, and means rendered effective by said interruption for actuating said head to release said tool.

3. In a machine for operating a tool to be drawn past a work piece, a head constructed to engage and disengage said tool comprising a pair of relatively movable members, means rendered effective by movement of said head for imparting a first relative movement to said movable members when said head reaches a first position and for imparting a second relative movement to said members when said head reaches a further position; and a tool engaging element positioned within said head and operably responsive to said first relative movement to disengage said tool and operably responsive to said second relative movement to engage said tool.

4. In a machine for operating a tool to be drawn through a work piece, a head for supporting said tool and for moving said tool through a working range including an intermediate loading position and a tool engaging position spaced from said loading position, said head comprising first and second relatively movable elements, means responsive to the approach of said head to said loading position for effecting a first relative movement between said members, means responsive to the approach of said head to said tool engaging position for effecting a second relative movement between said members, and a tool engaging element carried by said head and operably responsive to said first relative movement for disengaging said tool and operably responsive to said second relative movement for engaging said tool.

5. In a machine for operating a tool to be drawn past a work piece, a tool supporting head constructed to engage and disengage said tool, means for operating said head over a predetermined path, a tripping member responsive to the movement of said head, stationary means for supporting said tripping member adjacent the path of movement of said head for limited movement, said tripping member being effective to cooperate with said head when at one limit of movement to cause said head to disengage said tool, and effective when at its other limit of travel to cooperate with said head to cause said head to engage said tool.

6. In a machine for operating a tool to be drawn through a work piece, a head constructed to engage and disengage said tool, said head having an inner core member and a sleeve surrounding said core member and having a lost motion driving connection therewith; a tripping member positioned adjacent the path of travel of said head and effective to interrupt the motion of said core member so that continued motion of said head takes up said lost motion and renders said sleeve effective to drive said core member; and means positioned within said head and responsive to the driving of said core member by said sleeve for disengaging said tool.

7. In a machine for operating a tool to be drawn through a work piece, a head constructed to engage and disengage said tool, said head having an inner core member and a sleeve surrounding said core member and having a lost motion driving connection therewith; a tripping member positioned adjacent the path of travel of said head and effective to interrupt the motion of said core member so that continued motion of said head takes up said lost motion and renders said sleeve effective to drive said core member; and means including a toggle clamp positioned within said head and responsive to the driving of said core member by said sleeve to disengage said tool.

8. In a machine for operating a tool to be drawn through a work piece, a head constructed to engage and disengage said tool, said head having an inner core member and a sleeve surrounding said core member and having a lost motion driving connection therewith; a tripping member positioned adjacent the path of travel of said head and effective to interrupt the motion of said core member so that continued motion of said head takes up said lost motion and renders said sleeve effective to drive said core member; said tripping member being rendered effective by the driving of said core member by said sleeve to actuate said head to disengage said tool.

9. In a machine for operating a tool to be drawn through a work piece, a head constructed to engage and disengage said tool, said head having an inner core member and a sleeve surrounding said core member and having a lost motion driving connection therewith; a tripping member positioned adjacent the path of travel of said head and effective to interrupt the motion of said core member so that continued motion of said head takes up said lost motion and renders said sleeve effective to drive said core member; a tool engaging element movably mounted within said head; said tripping member being effective upon the driving of said core member by said sleeve to actuate said tool engaging element to release said tool.

CARL J. HALBORG.